2,708,203

PREPARATION OF POLYMERIC TITANIUM ORGANIC COMPOUNDS

John H. Haslam, Wilmington, Del., assignor to E. I. du Pont de Nemours and Company, Wilmington, Del., a corporation of Delaware No Drawing. Application February 17, 1953, Serial No. 337,438

7 Claims. (Cl. 260—414)

This invention pertains to an acidolysis reaction of polymeric titanium and zirconium acylates, and more particularly to novel and improved processes for manufacturing certain polymeric acylates of said metals, the acylate radicals of which are derived from high-boiling carboxylic acids.

The direct acylation of ortho esters of titanium by reaction with carboxylic acids causes some condensation and polymerization of the resulting titanium acylate (sometimes referred to as "carboxylate"). The direct acylation, by the methods of U. S. No. 2,621,193 in particular, and to a lesser degree by those of U. S. No. 2,621,195, produces from high-boiling carboxylic acids reaction product mixtures which are difficult to purify due to the solubility of the acylating acid in the product. Products made from long chain acids, such as, for example, stearic acid, are even more difficult and expensive to purify because solvent extraction must be resorted to for removal of any unreacted acids or by-products.

It is among the objects of this invention to overcome these and other disadvantages in polymeric Group IV metal acylate manufacture, and to provide, in particular, a new acyl radical exchange reaction of polymeric titanium and zirconium acylates. A further object is to provide an improved, direct process for the manufacture of organic solvent-soluble, relatively pure polymeric acylates of titanium and zirconium of relatively high-boiling carboxylic acids. Other objects will be apparent from the ensuing description.

These objects are accomplished herein by mixing and reacting a polymeric group IV metal acylate with a carboxylic acid and separating the acylate product from the co-product carboxylic acid formed from the exchanged acyl radical of the initial polymeric acylate.

More specifically, the invention comprises intimately commingling for reaction a polymeric titanium acylate with a carboxylic acid having a higher boiling point than the carboxylic acid co-product corresponding to the acyl radicals of the original polymeric titanium acylate, removing the coproduct carboxylic acid formed in the reaction by subjecting the reaction products to distillation, and recovering the polymeric titanium acylate product.

In one preferred adaptation of the invention, two moles of a long chain (8–24 carbon atoms) or high-boiling aliphatic carboxylic acid, such as, for example, stearic acid, are suitably commingled and commixed for heating and reaction in a reaction vessel equipped with a distillation head with one mole unit of a polymeric titanium acylate, as for example polymeric titanium propionate having the formula:

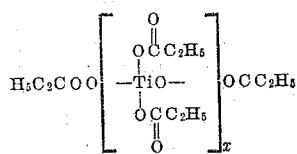

in which $x$ is a number greater than one. To promote comixing of the reactants, use of an inert organic solvent can be resorted to, such as a hydrocarbon compound adapted to form an azeotrope with the lower boiling reaction co-product acid and thereby facilitate separation from the reaction mixture. Examples of utilizable solvents include benzene, toluene, xylene, cyclohexane, etc. Propionic acid is distilled off as formed, and recovery is effected of the new product, a polymeric titanium stearate, a waxy solid, useful as a wax substitute, having the formula:

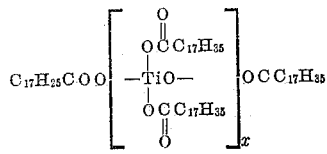

If desired, lower boiling acid co-products can be recycled for reuse in the process to make more of the initial polymeric titanium acylate from a titanium ortho ester.

The polymeric titanium acylates of high-boiling carboxylic acids of this invention, in addition to their usefulness as waxes, can be employed as surface active agents, lubricants, and lubricant additives, etc. They will vary from viscous liquids to waxy solids, depending upon the chain length or configuration of the acyl groups present therein.

To a clearer understanding of the invention, the following examples are given. These are merely in illustration and not in limitation of the invention.

Example I 176 parts by weight of n-butyric acid was mixed with 284 parts of tetraisopropyl titanate in a distillation type reaction vessel. 1 mole of water was added slowly to the mixture, with good agitation. After the water addition, the temperature of the mixture was raised to 100° C. and 216 parts of isopropanol was distilled off and a polymeric titanium butyrate produced which had a few isopropoxy groups (less than ½ mole unit isopropoxy radical per atom of Ti) still remaining attached to the Ti atom. To this polymeric titanium butyrate was added 565 parts of oleic acid with agitation and 186 parts of distillate was then distilled off, of which 164 parts was butyric acid. The reaction product was found to consist essentially of polymeric titanium oleate.

Example II 3 mole parts by weight of isobutyric acid were added to one mole part of tetraisopropyl titanate in a distillation reaction vessel. Three mole parts of isopropanol and one mole part of isopropyl isobutyrate were then distilled off to produce a polymeric titanium diisobutyrate. To this polytitanium diisobutyrate was added two moles parts of stearic acid, and a final polymeric titanium stearate product,

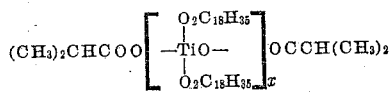

was obtained by distilling off the resultant 2 mole parts of isobutyric acid.

While the invention has been described as applied to certain specific embodiments thereof, it is not restricted thereto. Hence, due variance therefrom can be resorted to without departing from its underlying principles and scope. Thus, the polymeric or condensed titanium or zirconium acylate useful as a starting reactant herein has substantially the general formula:

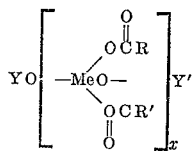

wherein Y and Y' in the chain terminating groups comprise an alkyl (methyl, ethyl, propyl, butyl, etc.) or an acyl radical, R and R' equal a radical selected from the group hydrogen, alkyl, cycloalkyl, aryl radical, alkene or an alkylaryl radical, and $x$ is greater than 1 and preferably ranges from 2–100. Preferably the acylate

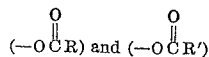

substituent groups are such that in the reaction the exchanged acid evolved or produced therefrom is of relatively low boiling point, e. g., will contain from 2–5 carbon atoms and not more than 8 carbon atoms in its chain. Among examples of preferred useful polymeric acylates, polymeric titanium or zirconium acetate, polymeric titanium or zirconium propionate, polymeric titanium or zirconium isobutyrate, and the like, can be mentioned. The polymeric or condensed titanium acylates are especially useful and preferred for employment. They can be readily prepared by reacting an alkyl orthotitanate, such as tetraethyl titanate, with a carboxylic acid and a regulated quantity of water, as contemplated in my U. S. Patent 2,621,195. Thus, as disclosed in that patent, to one mole of an ortho ester of titanium there can be added about two moles of a monocarboxylic acid and controlled addition then effected of about one mole water per atom of titanium, followed by heating of the reactants until the desired polymeric polytitanic ester is formed. Alternatively, the methods disclosed in U. S. Patent 2,621,193 can be utilized in effecting such preparation. The product of such reactions, depending on the exact quantities of reactants, will contain a small amount of residual alkoxy radical, in the terminal group for example, not completely removed by the acylation reaction. Furthermore, by reacting the proper quantity of carboxylic acid with the titanium acylate, a mixed titanium acylate having any desired ratio of acylate groups may be produced. Such mixed titanium acylates can be produced by reacting less than the stoichiometric equivalent of carboxylic acid with the titanium acylate and separating the co-product carboxylic acid from the reaction mixture. Such a reaction is represented by the equation:

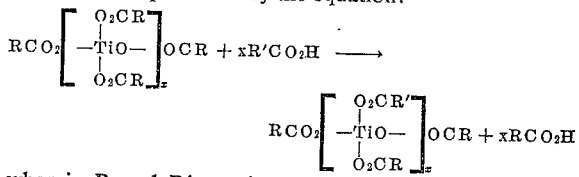

wherein R and R' consist of an alkyl, cycloalkyl, aryl, alkene, and alkylaryl radical, and $x$ is a number greater than one.

The acylating carboxylic acid selected for reaction with the initial polymeric titanium acylate can consist of any mono- or polycarboxylic acid which has a higher boiling point than the exchangeable acyl radical of the original titanium or zirconium acylate in the acid form. For example, in the case where the original compound is polymeric titanium butyrate, the polymer unit being represented by the formula

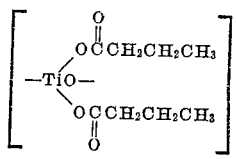

any carboxylic acid boiling higher than n-butyric acid can be used. Examples of such acids include those containing decanoic, hyptylic, sabacic, caprylic, capric, palmitic, oleic, stearic, lauric, behenic, adipic, benzoic, ortho chlorbenzoic, trichloroacetic, etc. Mixtures of acids, such as, for example, those occurring in natural fats and oils, and the like, are also contemplated for use. A wider choice, with regard to boiling point of reactant carboxylic acids, can be used when the co-product carboxylic acid is separated from the product titanium acylate by means other than distillation, as for example fractional crystallization or precipitation of either the co-product carboxylic acid or the product polymeric titanium acylate.

While specific temperatures have been mentioned and utilized herein, the invention is not to be construed as restricted thereto. In general, use is contemplated of any temperature designed to control and effect the desired reaction and the subsequent recovery, by distillation, of the acylating acid which is displaced. If desired, recourse can be had to any convenient and desired pressure during the distillation.

I claim as my invention:

1. A process for acidolysis of a polymeric group IV metal acylate corresponding to the formula

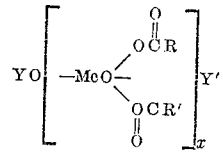

wherein Me is selected from the group consisting of titanium and zirconium, Y and Y' consist of a radical selected from the group alkyl and acyl, R and R' are selected from the group hydrogen, alkyl, cycloalkyl, aryl, alkene and alkylaryl, and $x$ is greater than 1, which comprises reacting said acylate with a carboxylic acid.

2. A process for producing a polymeric group IV metal acylate selected from the group consisting of titanium and zirconium comprising reacting a polymeric fourth group acylate of said metals corresponding to the formula

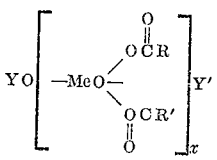

wherein Y and Y' are selected from the group consisting of an alkyl and acyl radical, R and R' are selected from the group consisting of hydrogen, alkyl, cycloalkyl, aryl, alkene and alkylaryl, and $x$ is a number greater than 1, with a carboxylic acid having a higher boiling point than the carboxylic acid co-product which corresponds to the acyl radical of said polymeric metal acylate reactant, removing by distillation from the reaction mass co-product carboxylic acid formed in the reaction, and recovering the resulting polymeric group IV metal acylate product.

3. A process for producing a polymeric titanium acylate comprising reacting about one mole unit of a polymeric titanium acylate corresponding to the formula:

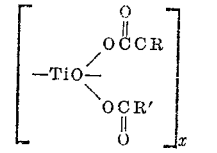

wherein R and R' are selected from the group consisting of an alkyl, cycloalkyl, aryl, alkene and alkylaryl radical, and $x$ is a number greater than 1 with about two moles of a saturated, monocarboxylic acid having a higher boiling point than the carboxylic acid product of an acyl radical in said acylate reactant, removing by distillation co-product acid formed in the reaction, and recovering the desired polymeric titanium acylate reaction product.

4. A process for the production of polymeric titanium stearate, by commingling and reacting in a reaction vessel about two moles parts of stearic acid with one mole part of polymeric titanium butyrate, removing by distillation co-product butyric acid formed in the reaction and recovering the resulting acylate product.

5. A process for the production of polymeric titanium oleate, by commingling and reacting in a reaction vessel about two moles parts of oleic acid with one mole party of polymeric titanium butyrate, removing by distillation co-product butyric acid formed in the reaction and recovering the resulting acylate product.

6. A process for the production of polymeric titanium oleate, by commingling and reacting in a reaction vessel about two moles parts of oleic acid with one mole part of polymeric titanium propionate, removing by distillation co-product propionic acid formed in the reaction and recovering the resulting acylate product.

7. A process for producing polymeric mixed titanium acylates comprising commingling and reacting a polymeric titanium acylate corresponding to the formula:

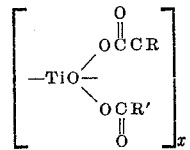

wherein R and R' consist of an alkyl radical containing from 2–5 carbon atoms and $x$ is a number greater than 1 with less than the stoichiometric equivalent of a carboxylic acid of higher boiling point than the carboxylic acid co-product corresponding to the acyl radical of the polymeric titanium acylate reactant, removing said co-product from the reaction product by distillation, and recovering said product.

References Cited in the file of this patent

UNITED STATES PATENTS

| | | |
|---|---|---|
| 2,614,112 | Boyd | Oct. 14, 1952 |
| 2,621,194 | Balthis | Dec. 9, 1952 |
| 2,621,195 | Haslam | Dec. 9, 1952 |